(12) United States Patent
Tubbs

(10) Patent No.: US 8,752,339 B1
(45) Date of Patent: Jun. 17, 2014

(54) CONVERTIBLE DOOR SYSTEM AND METHOD OF OPERATION

(71) Applicant: The Boeing Company, Chicago, IL (US)

(72) Inventor: Gregory A. Tubbs, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/666,286

(22) Filed: Nov. 1, 2012

(51) Int. Cl.
*E04B 1/346* (2006.01)

(52) U.S. Cl.
USPC ..................................... 52/64; 52/65; 52/79.5

(58) Field of Classification Search
USPC ................. 52/64, 79.5, 79.7, 79.8, 65, 69, 71
See application file for complete search history.

(56) References Cited

U.S. PATENT DOCUMENTS

| | | | | |
|---|---|---|---|---|
| 2,011,528 | A * | 8/1935 | Seay | 256/26 |
| 2,395,691 | A * | 2/1946 | Smith | 52/69 |
| 2,760,443 | A * | 8/1956 | Gobrecht | 105/315 |
| 2,895,717 | A * | 7/1959 | De Falco | 256/25 |
| 3,792,557 | A * | 2/1974 | Pitts | 52/65 |
| 3,869,841 | A * | 3/1975 | Wahlquist | 52/745.14 |
| 5,544,870 | A * | 8/1996 | Kelley et al. | 256/26 |
| 6,007,025 | A | 12/1999 | Coughren et al. | |
| 6,079,669 | A | 6/2000 | Hanay et al. | |
| 6,615,421 | B2 | 9/2003 | Itakura | |
| 7,152,257 | B2 * | 12/2006 | Lasch et al. | 4/661 |
| 7,765,744 | B2 * | 8/2010 | Herron | 52/79.5 |
| 7,866,603 | B2 | 1/2011 | Cooper et al. | |
| 7,941,976 | B2 * | 5/2011 | Herron | 52/79.5 |
| 8,109,044 | B2 * | 2/2012 | Graber | 52/36.2 |
| 8,322,086 | B2 * | 12/2012 | Weber | 52/79.5 |
| 2010/0092251 | A1* | 4/2010 | Heselden | 405/302.4 |

* cited by examiner

*Primary Examiner* — Basil Katcheves
(74) *Attorney, Agent, or Firm* — Hope Baldauff, LLC

(57) ABSTRACT

The present disclosure is generally directed to a system and method of operation for a convertible door system including a door accessible compartment having a moveable dividing wall that substantially divides the compartment into a first and a second sub-compartment. A first door assembly, configured to allow access to the first sub-compartment, is disposed between a first of two opposing sidewalls and the moveable dividing wall. A second door assembly, configured to allow access to the second sub-compartment, is disposed between a second of the two opposing sidewalls and the moveable dividing wall. A first and a second hinge assembly are adapted to rotationally join the first and second door assembly to respective opposing sidewalls. A third hinge assembly is adapted to rotationally join the moveable dividing wall to either the first door assembly or the second door assembly.

7 Claims, 19 Drawing Sheets

CONVERTIBLE DOOR SYSTEM AND METHOD OF OPERATION

TECHNICAL FIELD

The technical field presented herein is directed toward a convertible entry door system for accessibility to compartments where a standard door is typically used and at times requires a special enlarged access configuration.

BACKGROUND

Handicapped-accessible aircraft lavatories typically include a wheelchair region and a toilet assembly adjacent to a sink assembly. The sink assembly includes a basin positioned at a predetermined height and a predetermined lateral distance with respect to the toilet seat. However, single handicap lavatories of this type consume large amounts of valuable aircraft floor space that cannot be used for any other function than a handicap lavatory.

Aircraft designers have attempted to address the inefficient use of space in providing a handicap access lavatory by creating expandable sections of a standard-sized non-handicap lavatory enclosure. These expandable lavatories are for use in limited spaces on an airplane, however, they must be positioned proximate a doorway area of the airplane to accommodate an expandable section that moves into the doorway area. An expandable module may be pivotally attached to a stationary assembly conventionally affixed to the ceiling and floor of the airplane, where during take-off and landing, the module is locked in a stowed position within the stationary assembly. During flight, module is unlocked and deployed within the doorway area.

Another attempted solution is a lavatory body that stows a storage module capable of being pulled out of and stowed again into the lavatory body. The storage module may include a closet for storing the coats and jackets of passengers that is pulled out of the lavatory body, thereby expanding the interior space of the lavatory unit for passenger use. However, a part of the closet that pulls out protrudes to the space in front of the aircraft door.

These solutions currently provided to expand aircraft lavatory compartment space for accommodation of handicap passengers require expansion into a door area that compromises safety issues of emergency egress should the aircraft need to evacuate passengers quickly. No expanded portion of the lavatory should block the door area for this reason. If an expansion portion were to fail to fully retract during an emergency evacuation, the door exit would be obstructed to some degree jeopardizing the safety of the aircraft passengers.

There exists a need to accommodate an aircraft lavatory that uses an existing footprint of a lavatory compartment that does not encroach upon necessary emergency evacuation paths. Additionally, there exists a need for a system that is simple to use and easily accommodates handicap access passenger ingress and egress from the compartment. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

Herein is disclosed a system for a convertible door system including a door accessible compartment having a rear wall and two opposing sidewalls, and a moveable dividing wall that substantially divides the door accessible compartment into a first sub-compartment and a second sub-compartment. A first door assembly is disposed on an outward section of the door accessible compartment between a first of the two opposing sidewalls and the moveable dividing wall, where the first door assembly is configured to allow access to the first sub-compartment. A first hinge assembly is adapted to rotationally join the first door assembly to the first of the two opposing sidewalls. A second door assembly is disposed on the outward section of the door accessible compartment between a second of the two opposing sidewalls and the moveable dividing wall, where the second door assembly is configured to allow access to the second sub-compartment. A second hinge assembly is adapted to rotationally join the second door assembly to the second of the two opposing sidewalls. A third hinge assembly is adapted to rotationally join the moveable dividing wall to at least one of the first door assembly or the second door assembly.

Herein is also disclosed a method of operating a convertible door system for a door accessible compartment, the method includes providing a moveable dividing wall that substantially divides the door accessible compartment into a first sub-compartment and a second sub-compartment, a first door assembly on an outward section of the door accessible compartment between a first sidewall of the door accessible compartment and the moveable dividing wall, and a second door assembly on the outward section of the door accessible compartment between a second sidewall of the door accessible compartment and the moveable dividing wall. The moveable dividing wall is attached to one of the first door assembly or the second door assembly, and the moveable dividing wall and the attached one of the first door assembly or the second door assembly, and the other of the first or second door assembly, is rotated one of outwardly away from or inwardly toward the outward section of the door accessible compartment. The moveable dividing wall and the attached one of the first door assembly or the second door assembly, and the other of the first or second door assembly, is configured to be secured to the outward section of the door accessible compartment, thereby enclosing the door accessible compartment and eliminating the first sub-compartment and the second sub-compartment.

Additionally, herein is disclosed a method of operating a convertible door system for a door accessible compartment, the method includes providing a moveable dividing wall that substantially divides the door accessible compartment into a first sub-compartment and a second sub-compartment, providing a first door assembly on an outward section of the door accessible compartment between a first sidewall of the door accessible compartment and the moveable dividing wall, and providing a second door assembly on the outward section of the door accessible compartment between a second sidewall of the door accessible compartment and the moveable dividing wall. The moveable dividing wall is configured to be attached to the first door assembly and the second door assembly. The moveable dividing wall, the first door assembly and the second door assembly is configured to be one of outwardly away from or inwardly toward the outward section of the door accessible compartment. The moveable dividing wall, the first door assembly and the second door assembly are configured to be secured to the outward section of the door accessible compartment, thereby enclosing the door accessible compartment and eliminating the first sub-compartment and the second sub-compartment.

The features, functions, and advantages that have been discussed can be achieved independently in various configurations of the present disclosure or may be combined in yet other configurations, further details of which can be seen with reference to the following description and drawings.

BRIEF DESCRIPTION OF THE DRAWINGS

The configurations presented herein will become more fully understood from the detailed description and the accompanying drawings, wherein.

DETAILED DESCRIPTION

The following detailed description is directed to standard sized entry doors mounted within walled compartment assemblies that function together as a door assembly thereby providing a larger access area to the walled compartment when needed or required. This movable door assembly can bridge between adjacent compartments, such as lavatories, to create one large compartment with an unobstructed entry, and a large enough opening to accommodate wheelchair access or other accessibility challenges where a single standard door cannot accommodate.

Figure 1:
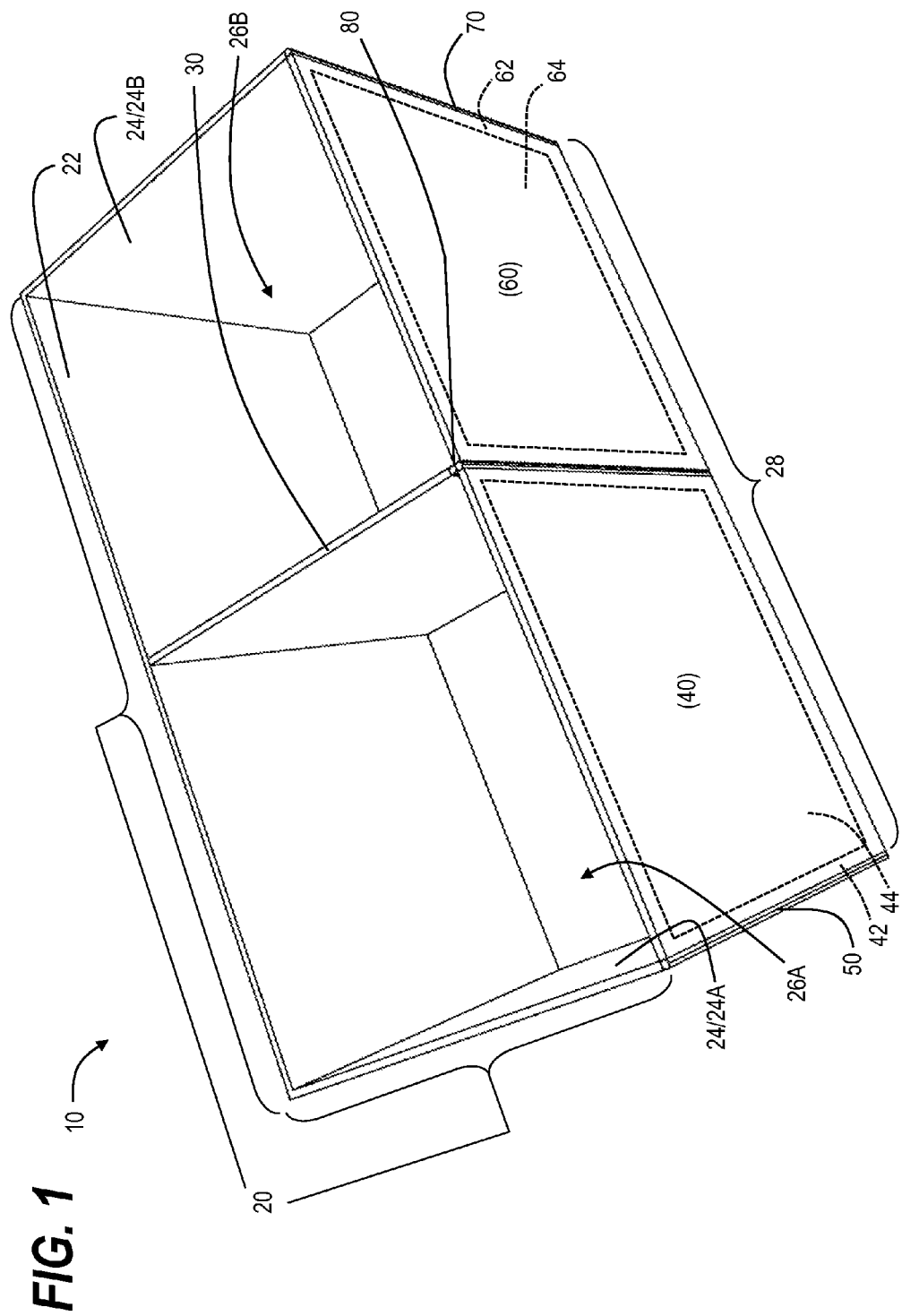
FIG. 1 illustrates a first configuration of a convertible door system where both doors are in a closed position.

FIG. 1 illustrates a first configuration of a convertible door system 10 where a pair of doors is in a closed position. A door accessible compartment 20 includes a rear wall 22 and two opposing sidewalls 24 projecting in a general orthogonal direction from the rear wall 22. A moveable dividing wall 30 is disposed to substantially bi-sect the door accessible compartment 20 into a first sub-compartment 26A and a second sub-compartment 26B. Each of these sub-compartments can, for example, contain a single lavatory facility, (see FIGS. 16-17 for a representative, non-limiting example). An outward section of the door accessible compartment 28 is disposed opposite the rear wall 22 and accommodates a first door assembly 40 that is pivotally attached via a first hinge assembly 50 to a first of two opposing sidewalls 24A/24B on a first peripheral side, and pivotally attached via a third hinge assembly 80 to the moveable dividing wall 30 on a second opposite peripheral side. The outward section of the door accessible compartment 28 further accommodates a second door assembly 60 that is pivotally attached via a second hinge assembly 70 to a second of the two opposing sidewalls 24B on a first peripheral side, and pivotally attached via the third hinge assembly 80 to the moveable dividing wall 30 on a second opposite peripheral side.

Both the first door assembly 40 and the second door assembly 60 can operate individually as a unitary door by itself with respect to the door accessible compartment 20, or each door assembly may include an integrated door within a door frame. For example, the first door assembly 40 may include a first door frame 42 that surrounds a first integrated door 44. In a similar manner, the second door assembly 60 may include a second door frame 62 that surrounds a second integrated door 64. Both the first integrated door 44 and the second integrated door 64 may be configured to open and close in either in a leftward or a rightward direction. Throughout the remainder of this disclosure, the first door assembly 40 and the second door assembly 60 can be equated functionally with either a single unified door or a combination of an integrated door 44, 64 within a door frame 42, 62, respectively.

Figure 2:
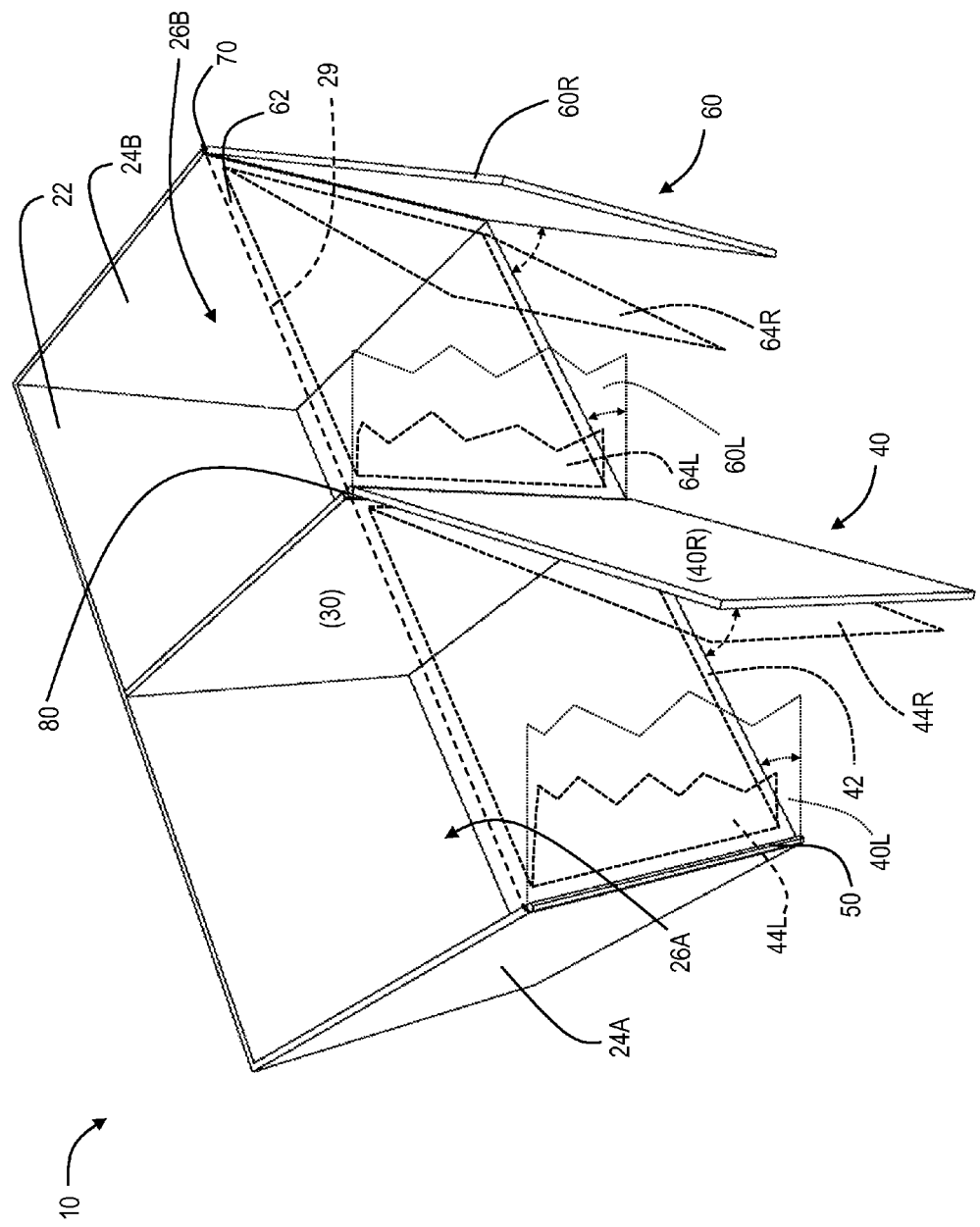
FIG. 2 illustrates the first configuration of a convertible door system of FIG. 1 where both doors are in a normal operating open position.

FIG. 2 illustrates the first configuration of a convertible door system of FIG. 1 where the first door assembly 40 and the second door assembly 60 are in a normal operating open position for non-handicap access to the door accessible compartment 20 by keeping the first sub-compartment 26A and the second sub-compartment 26B intact relative to the entire door accessible compartment 20. Note in FIG. 2 that each door assembly 40 or 60 may be disposed to rotate on either of its peripheral vertical edges. For example, first left opening door assembly 40L may be connected to the first of the two opposing sidewalls 24A to rotate between open and closed positions about the first hinge assembly 50. Likewise, a first right opening door assembly 40R may be connected to the moveable dividing wall 30 to rotate between open and closed positions about the third hinge assembly 80. In a similar manner, a second left opening door assembly 60L may be connected to the moveable dividing wall 30 to rotate between open and closed positions about the third hinge assembly 80. Likewise, a second right opening door assembly 60R may be connected to the second of the two opposing sidewalls 24B to rotate between open and closed positions about the second hinge assembly 70.

Similarly, when the first door assembly 40 and second door assembly 60 includes integrated doors within door frames, a first left opening integrated door 44L connected to the first door frame 42 proximate the first of the two opposing sidewalls 24A rotates between open and closed positions proximate the first hinge assembly 50. Likewise, a first right opening integrated door 44R connected to the first door frame 42 proximate the moveable dividing wall 30 rotates between open and closed positions proximate the third hinge assembly 80. In a similar manner, a second left opening integrated door 64L connected to the second door frame 62 proximate the moveable dividing wall 30 rotates between open and closed positions proximate the third hinge assembly 80. Likewise, a second right opening integrated door 64R connected to the second door frame 62 proximate the second of the two opposing sidewalls 24B rotates between open and closed positions proximate the second hinge assembly 70.

In each of these alternative rotational door positions, and in each combination of door configurations, FIG. 2 illustrates a normal, non-handicap access configuration where both the first door assembly 40 and second door assembly 60 allow access to the first sub-compartment 26A and second sub-compartment 26B, respectively, with the moveable dividing wall 30 maintaining two separate sections within the door accessible compartment 20.

Additionally, FIG. 2 illustrates an upper compartment support structure 29, (represented for clarity purposes as a dashed line), that provides an upper support to upper vertical portions of the first of the two opposing sidewalls 24A, the second of the two opposing sidewalls 24B, the moveable dividing wall 30, the first door assembly 40, the second door assembly 60, the first hinge assembly 50, the second hinge assembly 70 and the third hinge assembly 80. This upper compartment support structure 29 may be included as part of a ceiling support structure, (exemplary shown in FIGS. 16-17), not illustrated in FIGS. 1-15 for the purpose of providing clarity to the illustrations. Likewise, a bottom portion of the door accessible compartment 20 can provide a lower support to lower vertical portions of the first of the two opposing sidewalls 24A, the second of the two opposing sidewalls 24B, the moveable dividing wall 30, the first door assembly 40, the second door assembly 60, the first hinge assembly 50, the second hinge assembly 70 and the third hinge assembly 80.

Figure 3:
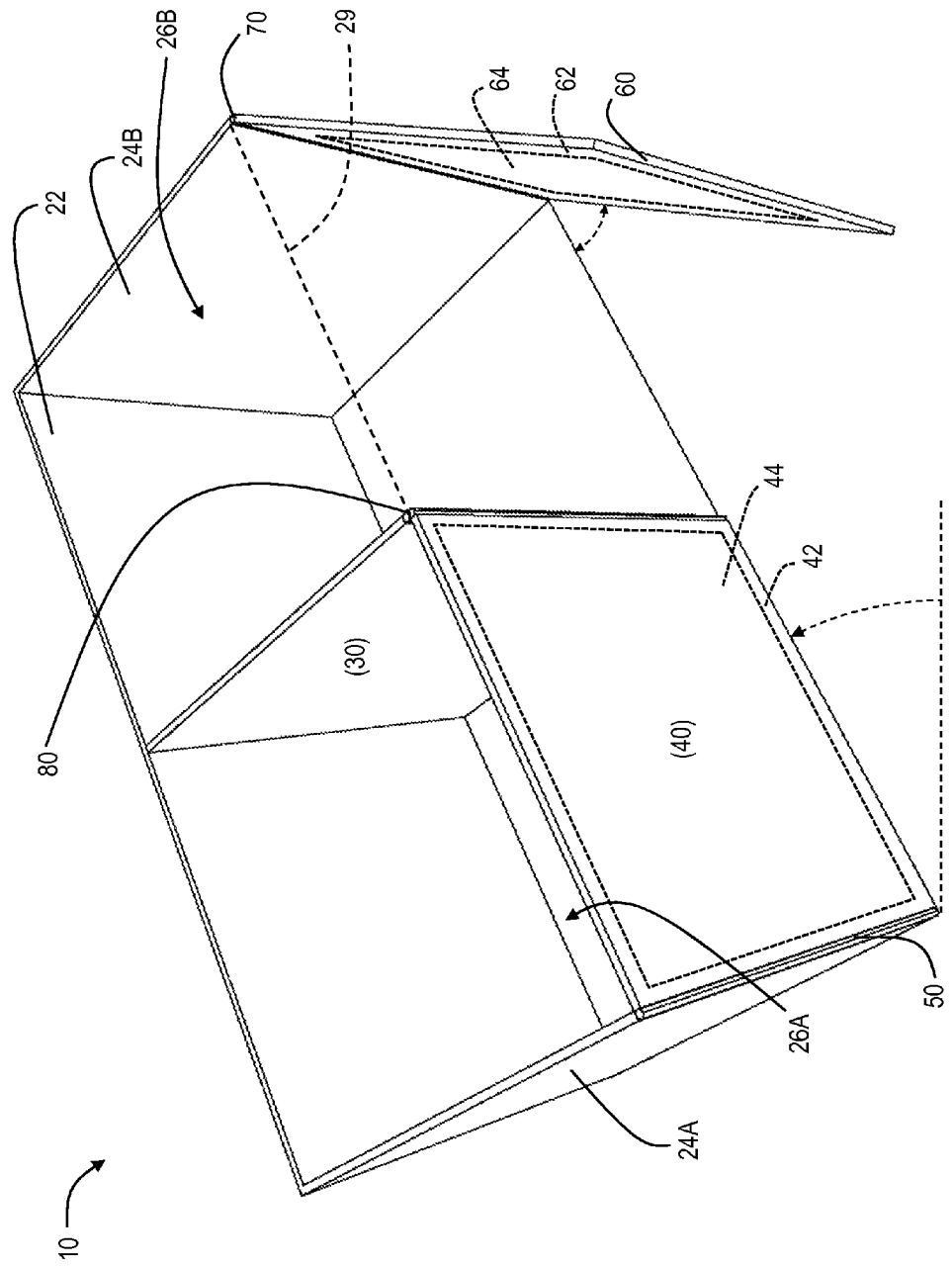
FIG. 3 illustrates the first configuration of a convertible door system of FIG. 1 where a second door assembly is in a normal operating open position and a first door assembly is being locked into a reverse normal operating position.

FIG. 3 illustrates the first configuration of a convertible door system of FIG. 1 where the second door assembly 60 is in a normal operating open position and the first door assembly 40 is being locked into a reverse normal operating position from FIG. 2. The first door assembly 40 is closed along the outward section of the door accessible compartment 28 and the first hinge assembly 50 is locked relative to the door accessible compartment 20, while the third hinge assembly 80 is unlocked relative to the door accessible compartment 20. However, the first door assembly 40 and the moveable dividing wall 30 remain connected via the third hinge assembly 80. The third hinge assembly 80 can consist of a single hinge, (not shown), having multiple connection points for the first door assembly 40, the second door assembly 60 and the moveable dividing wall 30, or it may consist of a plurality of hinges being connected one to another to allow similar independent rotation of each rotationally connected member about the third hinge assembly 80. At this stage, the moveable dividing wall 30 may be released from any connection means from the rear wall 22 or floor of the door accessible compartment 20 while still being rotationally connected via the third hinge assembly 80 to the rotating peripheral edge of the first door assembly 40.

Figure 4:
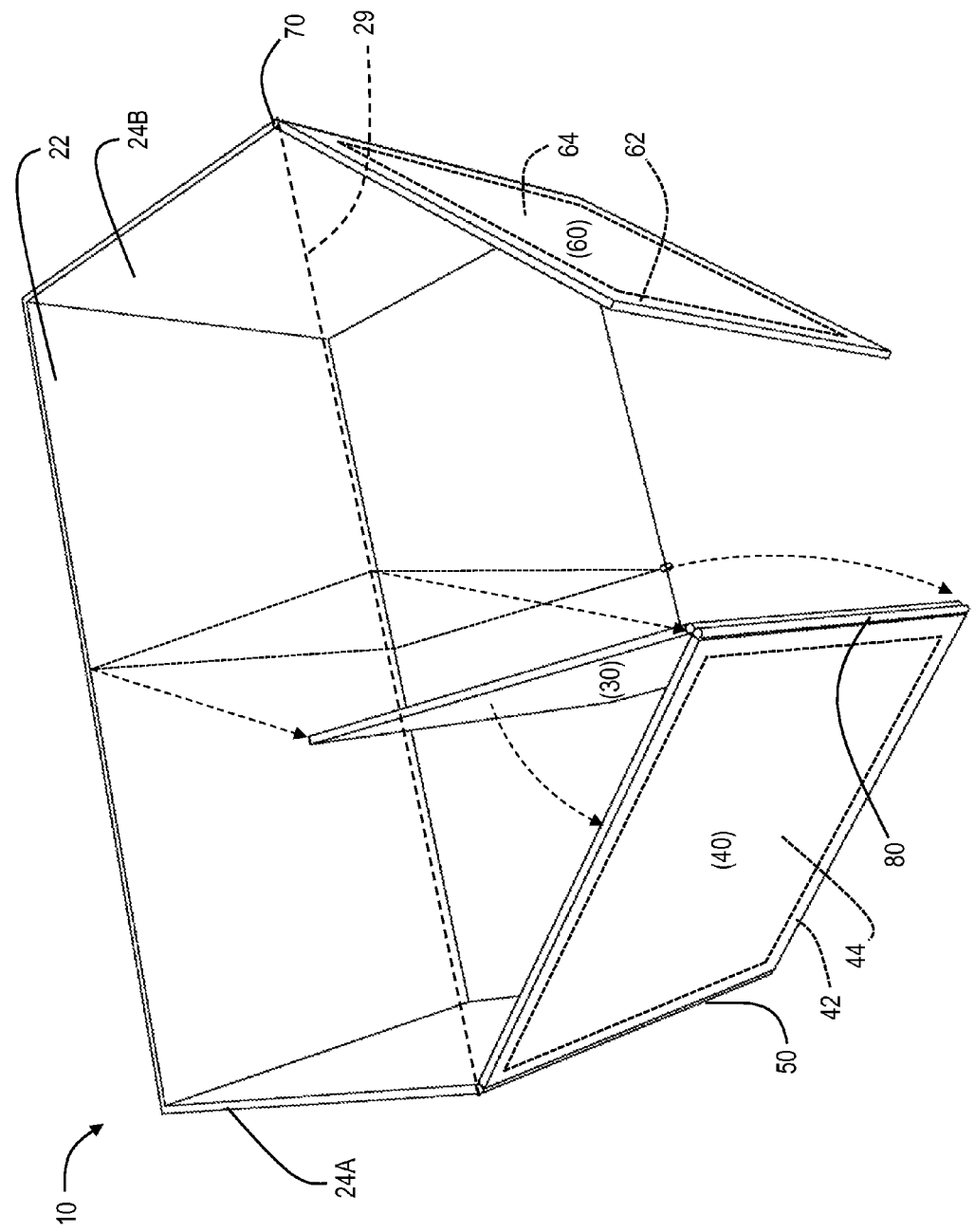
FIG. 4 illustrates the first configuration of a convertible door system of FIG. 1 where the second door assembly is in a normal operating open position and the first door assembly is opening in a reverse normal operating position connected to a moveable adjoining wall.

FIG. 4 illustrates the first configuration of a convertible door system of FIG. 1 where the second door assembly 60 is in a normal operating open position and the first door assembly 40 is opening in a reverse normal operating position rotationally connected to the moveable dividing wall 30. Here, the moveable dividing wall 30 rotates about the third hinge assembly 80 toward an inner facing portion of the first door assembly 40. The first door assembly 40 may either sequentially or simultaneously rotate about the first hinge assembly 50 with the rotational movement of the moveable dividing wall 30, and away from the outward section of the door accessible compartment 28.

Figure 5:
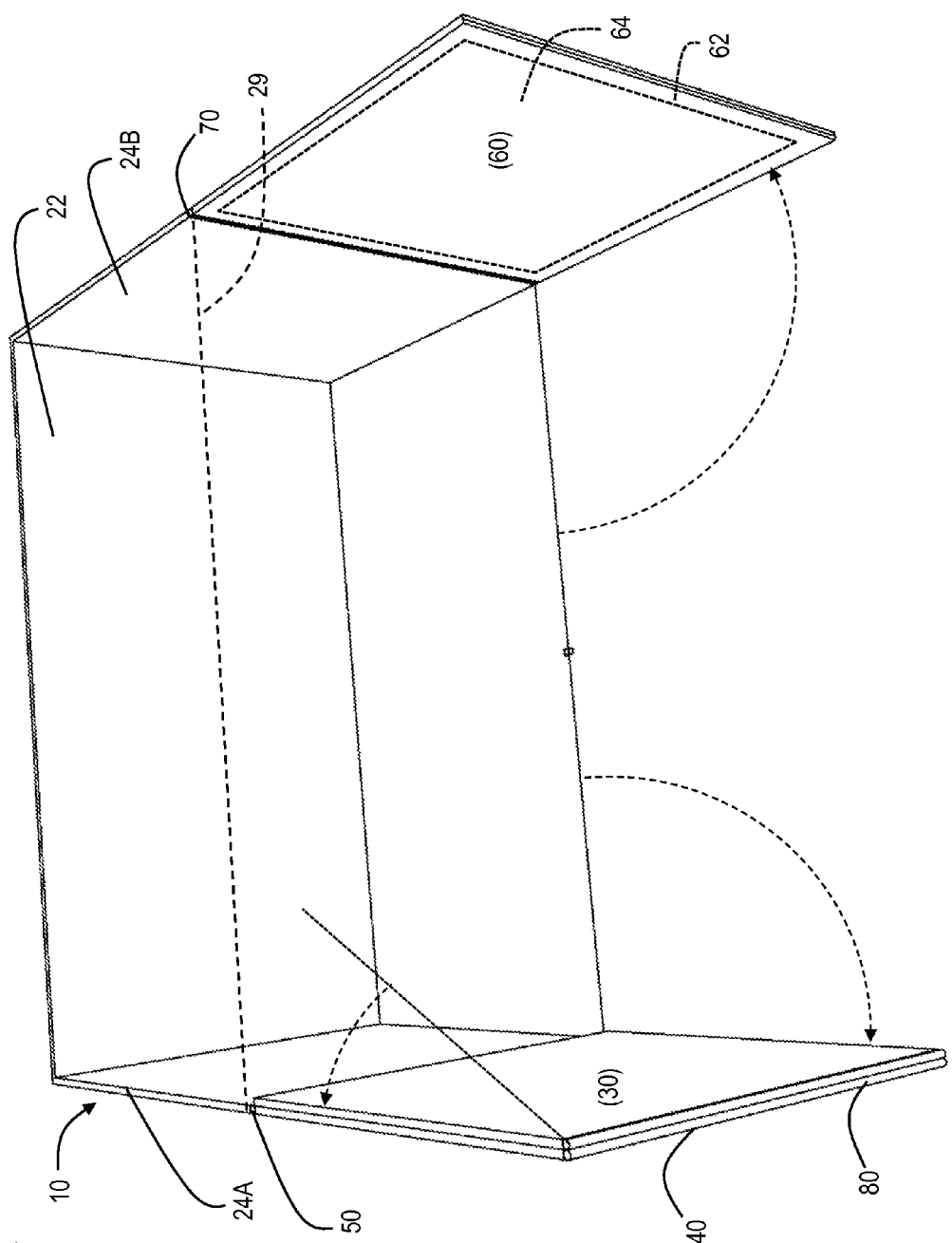
FIG. 5 illustrates the first configuration of a convertible door system of FIG. 1 where the second door assembly is in a normal operating open position and the first door assembly is opening in a reverse normal operating position having the moveable adjoining wall affixed thereto.

FIG. 5 illustrates the first configuration of a convertible door system of FIG. 1 where the second door assembly 60 is in a normal operating opening position and the first door assembly 40 is opening in a reverse normal operating position having the moveable dividing wall 30 affixed thereto.

Figure 6:
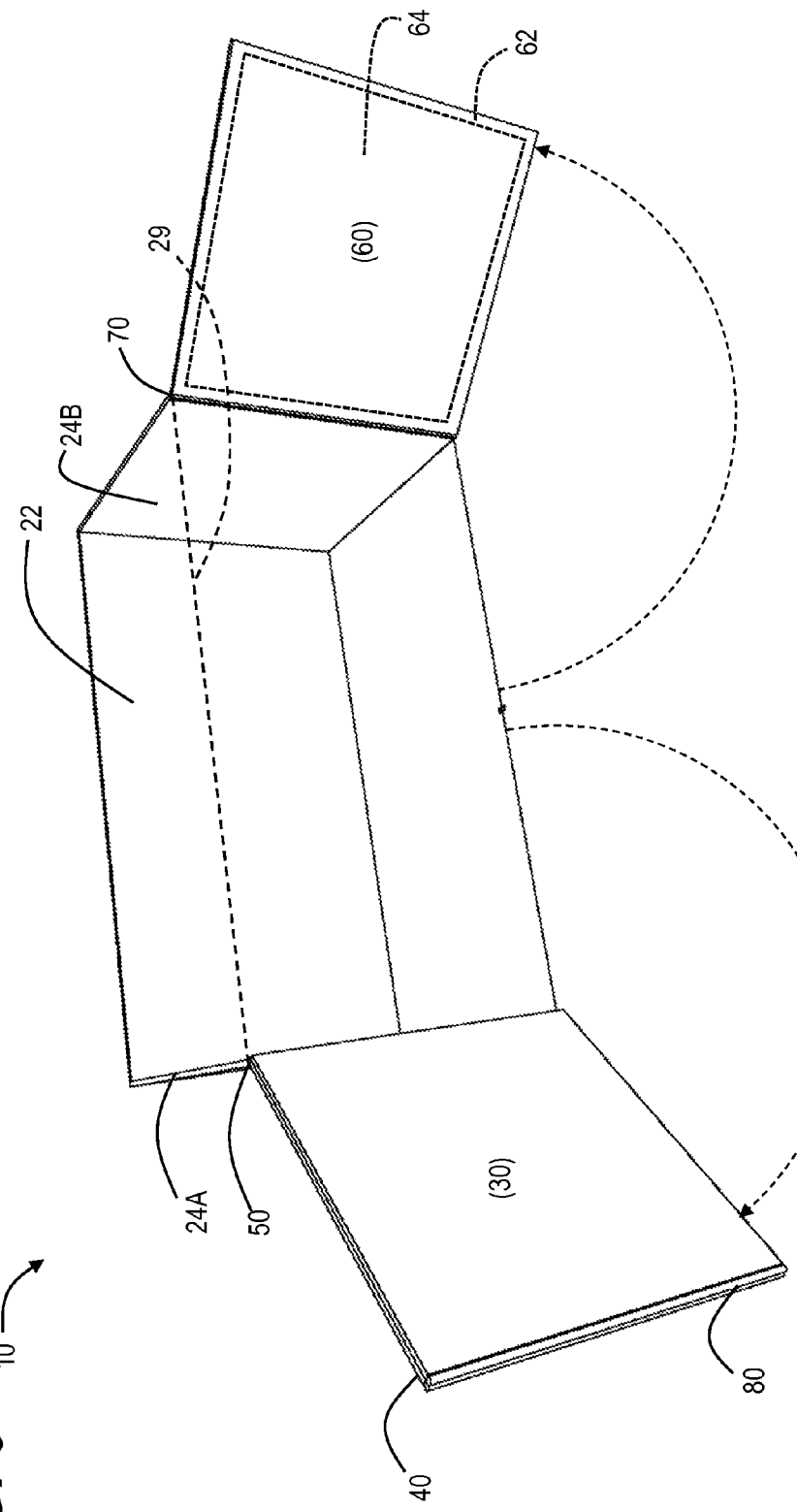
FIG. 6 illustrates the first configuration of a convertible door system of FIG. 1 where the second door assembly is in a normal operating open position and the first door assembly is opening in a reverse normal operating position having the moveable adjoining wall affixed thereto, where both doors being disposed in a fully open position.

FIG. 6 illustrates the first configuration of a convertible door system of FIG. 1 where the second door assembly 60 is in a normal operating open position and the first door assembly 40 is fully opened through a reverse normal operating position having the moveable dividing wall 30 affixed thereto. Both the first door assembly 40 and the second door assembly 60 are now illustrated as being in a fully open position to enable a larger access area to the door accessible compartment 20 with the moveable dividing wall 30 being secured to one side of the first door assembly 40. This larger access area can easily accommodate handicap access, and specialized handicap access equipment such as a wheelchair.

Figure 7:
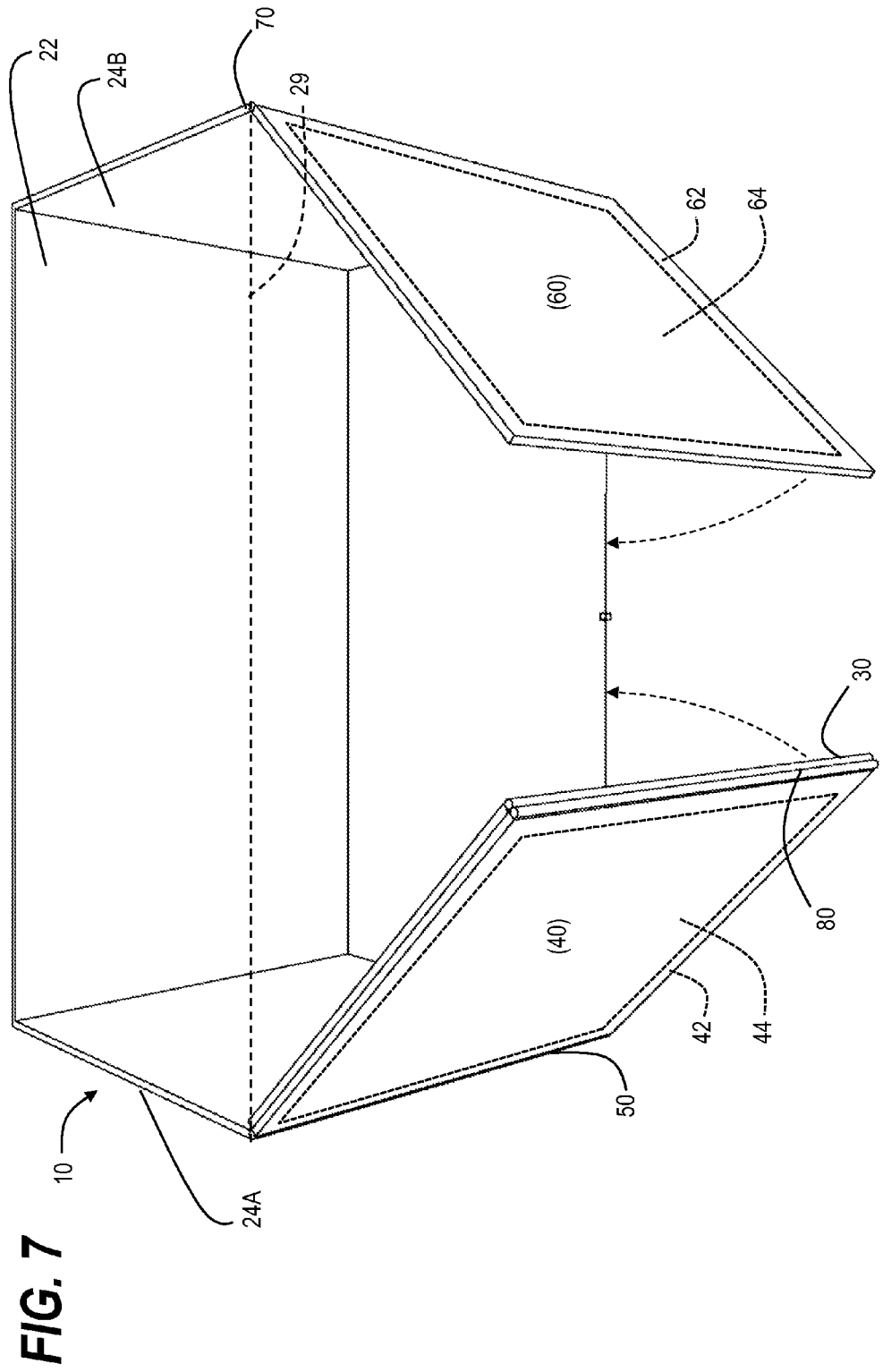
FIG. 7 illustrates the first configuration of a convertible door system of FIG. 1 where the second door assembly is in a normal operating closing position and the first door assembly is closing in a reverse normal operating position having the moveable adjoining wall affixed thereto, where both doors are moving towards a closed position.

FIG. 7 illustrates the first configuration of a convertible door system of FIG. 1 where the second door assembly 60 is in a normal operating closing position and the first door assembly 40 is closing in a reverse normal operating position having the moveable dividing wall 30 affixed thereto, where both the first door assembly 40 and the second door assembly 60 are moving towards a closed position in line with the outward section of the door accessible compartment 28.

Figure 8:
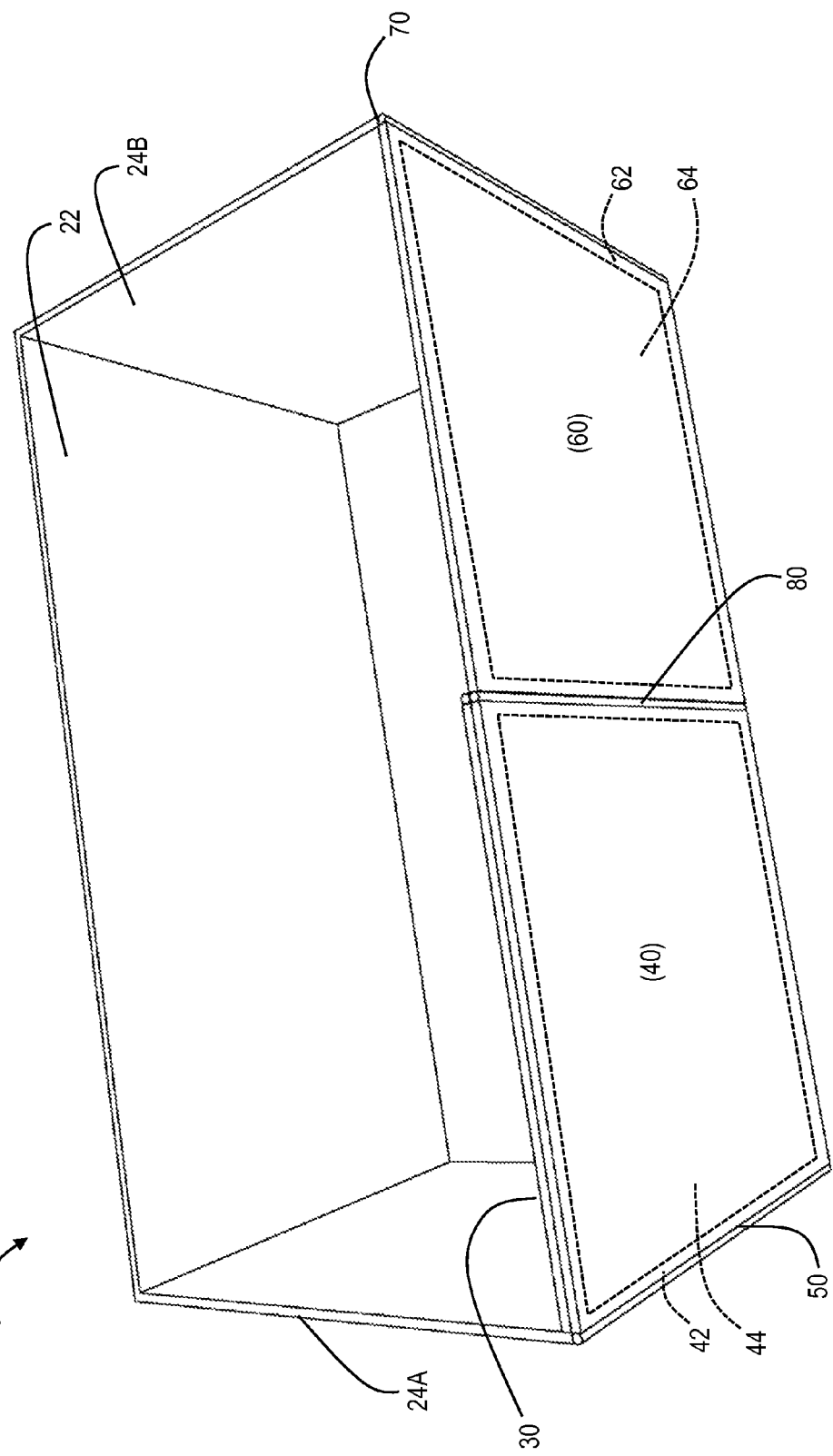
FIG. 8 illustrates the first configuration of a convertible door system of FIG. 1 where the second door assembly is in a normal operating closed position and the first door assembly is having the moveable adjoining wall affixed thereto being in a closed position.

FIG. 8 illustrates the first configuration of a convertible door system of FIG. 1 where the second door assembly 60 is in a normal operating closed position and the first door assembly 40 having the moveable dividing wall 30 affixed thereto is in a closed position as well. In this position, the first door assembly 40 and the second door assembly 60 would be secured to either the upper compartment support structure 29 and/or to a corresponding section of the floor of the door accessible compartment 20.

In summary, a convertible door system includes a door accessible compartment 20 including a rear wall 22 and two opposing sidewalls 24, and a moveable dividing wall 30 that substantially divides the door accessible compartment 20 into a first sub-compartment 26A and a second sub-compartment 26B. A first door assembly 40 disposed on an outward section of the door accessible compartment 28 between a first of the two opposing sidewalls 24A and the moveable dividing wall 30, the first door assembly 40 configured to allow access to the first sub-compartment 26A. A first hinge assembly 50 adapted to rotationally join the first door assembly 40 to the first of the two opposing sidewalls 24A, and a second door assembly 60 disposed on the outward section of the door accessible compartment 28 between a second of the two opposing sidewalls 24B and the moveable dividing wall 30, the second door assembly 60 configured to allow access to the second sub-compartment 26B. A second hinge assembly 70 adapted to rotationally join the second door assembly 60 to the second of the two opposing sidewalls 24B, and a third hinge assembly 80 adapted to rotationally join the moveable dividing wall 30 to at least one of the first door assembly 40 or the second door assembly 60.

The first door assembly 40 is rotationally and releaseably connected to one of the first hinge assembly 50 or the third hinge assembly 80, the second door assembly 60 being rotationally and releaseably connected to one of the second hinge assembly 70 or the third hinge assembly 80. The moveable dividing wall 30 remains in a releaseably fixed position to divide the door accessible compartment 20 into the first sub-compartment 26A and the second sub-compartment 26B.

The first door assembly 40 being rotationally connected to the first hinge assembly 50, where the moveable dividing wall 30 being rotationally connected to the first door assembly 40 via the third hinge assembly 80, and the second door assembly 60 being rotationally connected to the second hinge assembly 70. The moveable dividing wall 30 being rotated about the third hinge assembly 80 adapted to be releaseably joined to an interior side of the first door assembly 40.

The first door assembly 40, with the releaseably joined moveable dividing wall 30, and the second door assembly 60 can be configured to rotate outwardly away from the outward section of the door accessible compartment 28. Additionally, the first door assembly 40, with the releaseably joined moveable dividing wall 30, and the second door assembly 60 being configured to rotate inwardly toward the outward section of the door accessible compartment 28. The first door assembly 40, with the releaseably joined moveable dividing wall 30, and the second door assembly 60 being secured to the outward section of the door accessible compartment 28.

Figure 9:
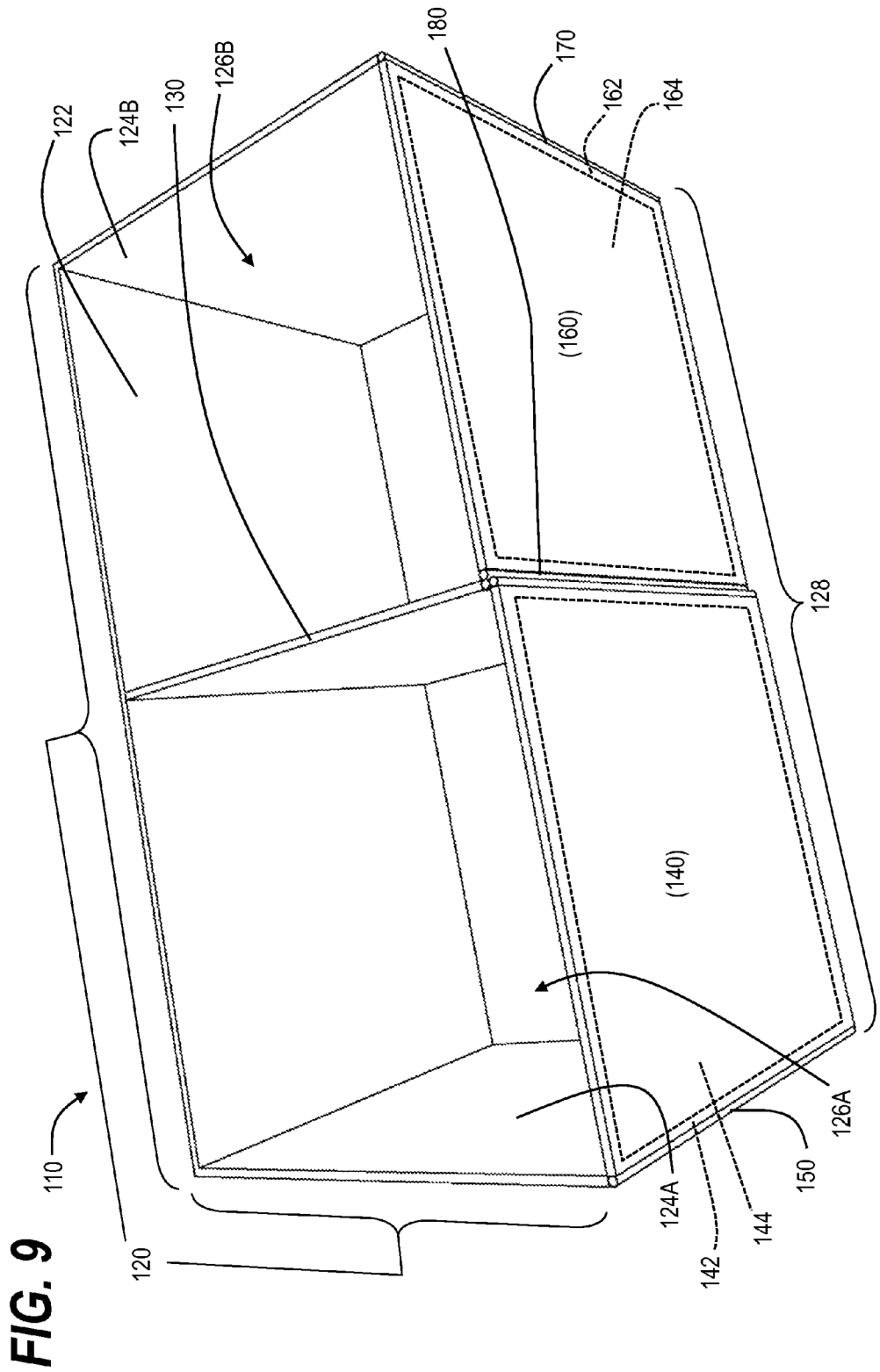
FIG. 9 illustrates a second configuration of a convertible door system where both doors are in a closed position.

FIG. 9 illustrates a second configuration of an alternative convertible door system 110, (similar to the first configuration of FIGS. 1-8, where a first door assembly 40 and a second door assembly 60 are in a closed position). Similar to FIG. 1, a door accessible compartment 120 includes a rear wall 122 and two opposing sidewalls 124 projecting in a general orthogonal direction from the rear wall 122. A moveable dividing wall 130 is disposed to substantially bi-sect the door accessible compartment 120 into a first sub-compartment 126A and a second sub-compartment 126B. Again, each of these sub-compartments can, for example, contain a single lavatory facility, (see FIGS. 16-17 for a representative, non-limiting example). An outward section of the door accessible compartment 128 is disposed opposite the rear wall 122 and accommodates a first door assembly 140 that is pivotally attached via a first hinge assembly 150 to a first of two opposing sidewalls 124A on a first peripheral side, and pivotally attached via a third hinge assembly 180 to the moveable dividing wall 130 on a second opposite peripheral side. The outward section of the door accessible compartment 128 further accommodates a second door assembly 160 that is pivotally attached via a second hinge assembly 170 to a second of the two opposing sidewalls 124B on a first peripheral side, and pivotally attached via the third hinge assembly 180 to the moveable dividing wall 130 on a second opposite peripheral side.

As shown in FIG. 1 and discussed above, both the first door assembly 140 and the second door assembly 160 can operate as a unitary door by itself with respect to the door accessible compartment 120, or each door assembly may include an integrated door surrounded by a door frame. For example, the first door assembly 140 may include a first door frame 142 that surrounds a first integrated door 144. In a similar manner, the second door assembly 160 may include a second door frame 162 that surrounds a second integrated door 164. Both the first integrated door 144 and the second integrated door 164 may be configured to open and close in either in a leftward or a rightward direction. Throughout the remainder of this disclosure, the first door assembly 140 and the second door assembly 160 can be equated functionally with either a single unitary door or a combination of an integrated door 144, 164 within a door frame 142, 162, respectively.

Figure 10:
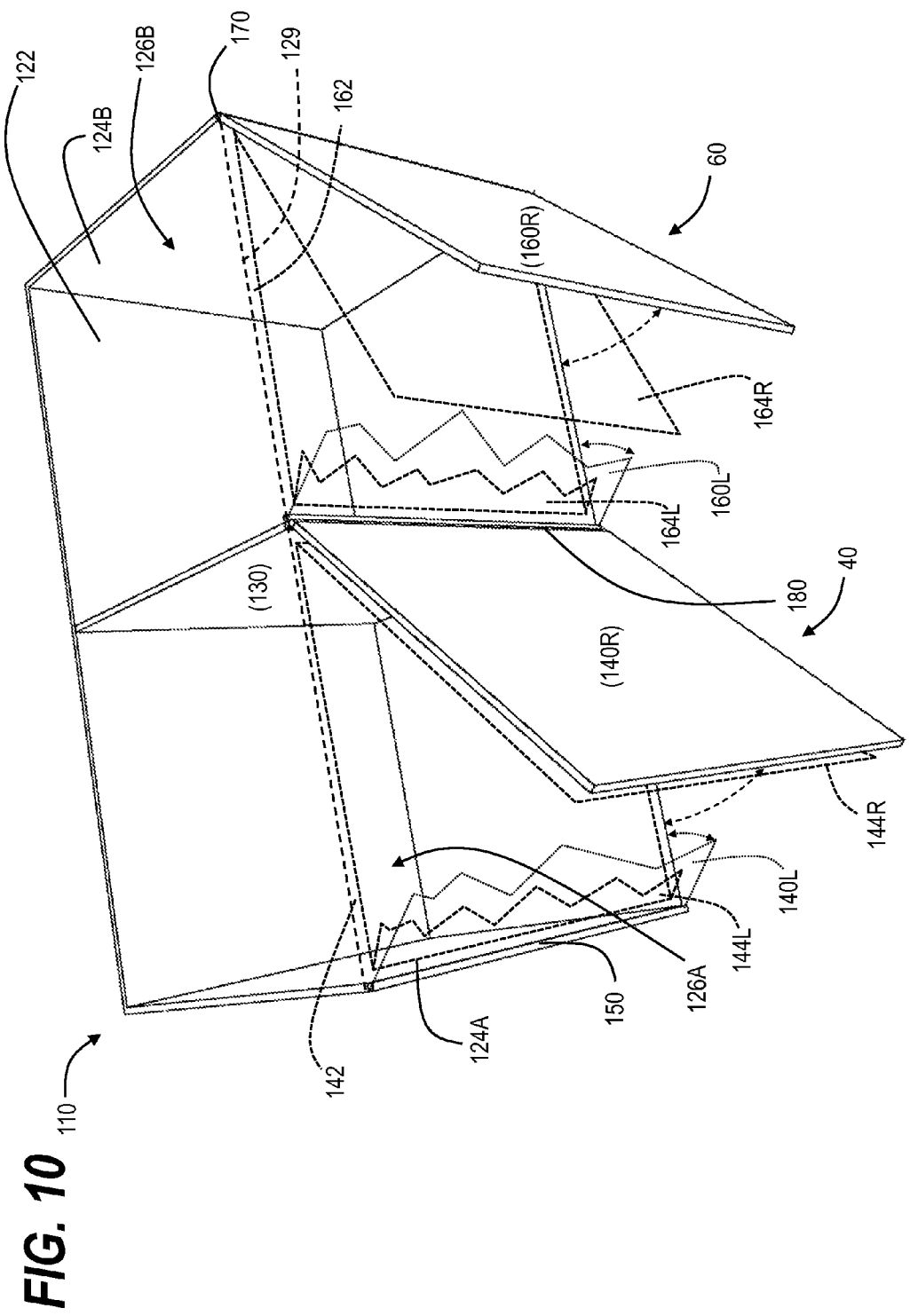
FIG. 10 illustrates the second configuration of a convertible door system of FIG. 9 where both doors are in a normal operating open position.

FIG. 10 illustrates the first configuration of a convertible door system of FIG. 9 where the first door assembly 140 and the second door assembly 160 can be in a normal operating open position for non-handicap access to the door accessible compartment 120 by keeping the first sub-compartment 126A and the second sub-compartment 126B intact relative to the entire door accessible compartment 120. Note in FIG. 10 that each door may be disposed to rotate on either of its peripheral vertical edges. For example, first left opening door assembly 140L may be connected to the first of the two opposing sidewalls 124A to rotate between open and closed positions about the first hinge assembly 150. Likewise, a first right opening door assembly 140R may be connected to the moveable dividing wall 130 to rotate between open and closed positions about the third hinge assembly 180. In a similar manner, a second left opening door assembly 160L may be connected to the second of the two opposing sidewalls 124B to rotate between open and closed positions about the second hinge assembly 170. Likewise, a second right opening door assembly 160R may be connected to the moveable dividing wall 130 to rotate between open and closed positions about the third hinge assembly 180.

Similarly, when the first door assembly 140 and second door assembly 160 includes integrated doors within door frames, a first left opening integrated door 144L connected the first door frame 142 to rotate between open and closed positions proximate the first hinge assembly 150. Likewise, a first right opening integrated door 144R connected to the first door frame 142 proximate the moveable dividing wall 130 rotates between open and closed positions proximate the third hinge assembly 180. In a similar manner, a second left opening integrated door 164L connected to the second door frame 162 proximate the moveable dividing wall 130 rotates between open and closed positions proximate the third hinge assembly 180. Likewise, a second right opening integrated door 164R connected to the second door frame 162 proximate the second of the two opposing sidewalls 124B rotates between open and closed positions proximate the second hinge assembly 170.

In each of these alternative rotational door positions, and in each combination of door configurations, FIG. 10 illustrates a normal, non-handicap access configuration where both the first door assembly 140 and second door assembly 160 allow access to the first sub-compartment 126A and second sub-compartment 126B, respectively, with the moveable dividing wall 130 maintaining two separate sections within the door accessible compartment 120.

Additionally, FIG. 10 illustrates an upper compartment support structure 129, (represented for clarity purposes as a dashed line), that provides an upper support to upper vertical portions of the first of the two opposing sidewalls 124A, the second of the two opposing sidewalls 124B, the moveable dividing wall 130, the first door assembly 140, the second door assembly 160, the first hinge assembly 150, the second hinge assembly 170 and the third hinge assembly 180. This upper compartment support structure 129 may be included as part of a ceiling support structure, (exemplary shown in FIGS. 16-17), not illustrated in FIGS. 1-15 for the purpose of providing clarity to the illustrations. Likewise, a bottom portion of the door accessible compartment 120 can provide a lower support to lower vertical portions of the first of the two opposing sidewalls 124A, the second of the two opposing sidewalls 124B, the moveable dividing wall 130, the first door assembly 140, the second door assembly 160, the first hinge assembly 150, the second hinge assembly 170 and the third hinge assembly 180.

Figure 11:
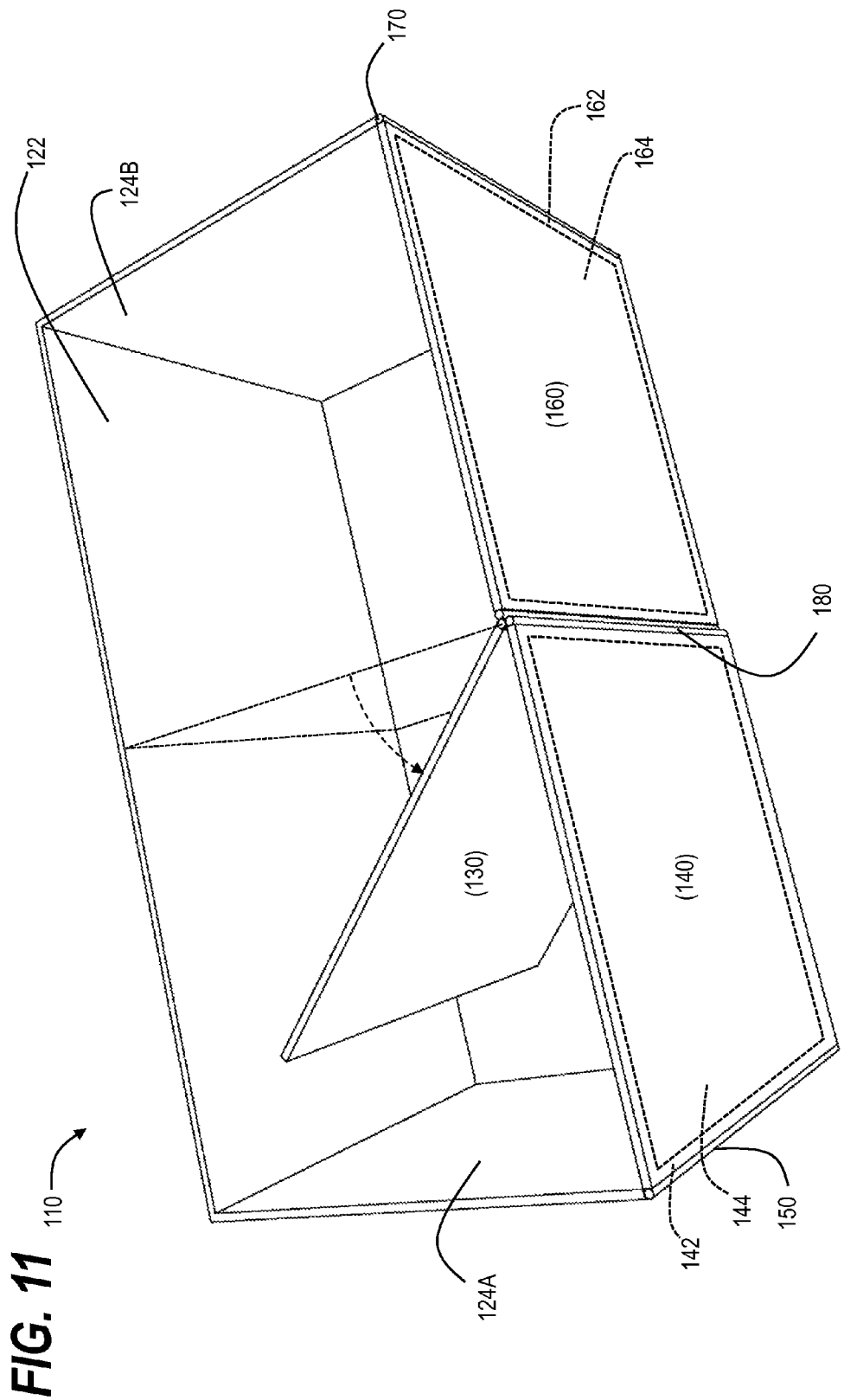
FIG. 11 illustrates the second configuration of a convertible door system of FIG. 9 where a moveable adjoining wall is released to rotate toward a first door assembly about a common hinge assembly.

FIG. 11 illustrates the second configuration of a convertible door system of FIG. 9 where the moveable dividing wall 130 is released from the door accessible compartment 120 to rotate toward the first door assembly 140 about the third hinge assembly 180. Here, the moveable dividing wall 130 rotates about the third hinge assembly 180 toward an inner facing portion of the first door assembly 140.

Figure 12:
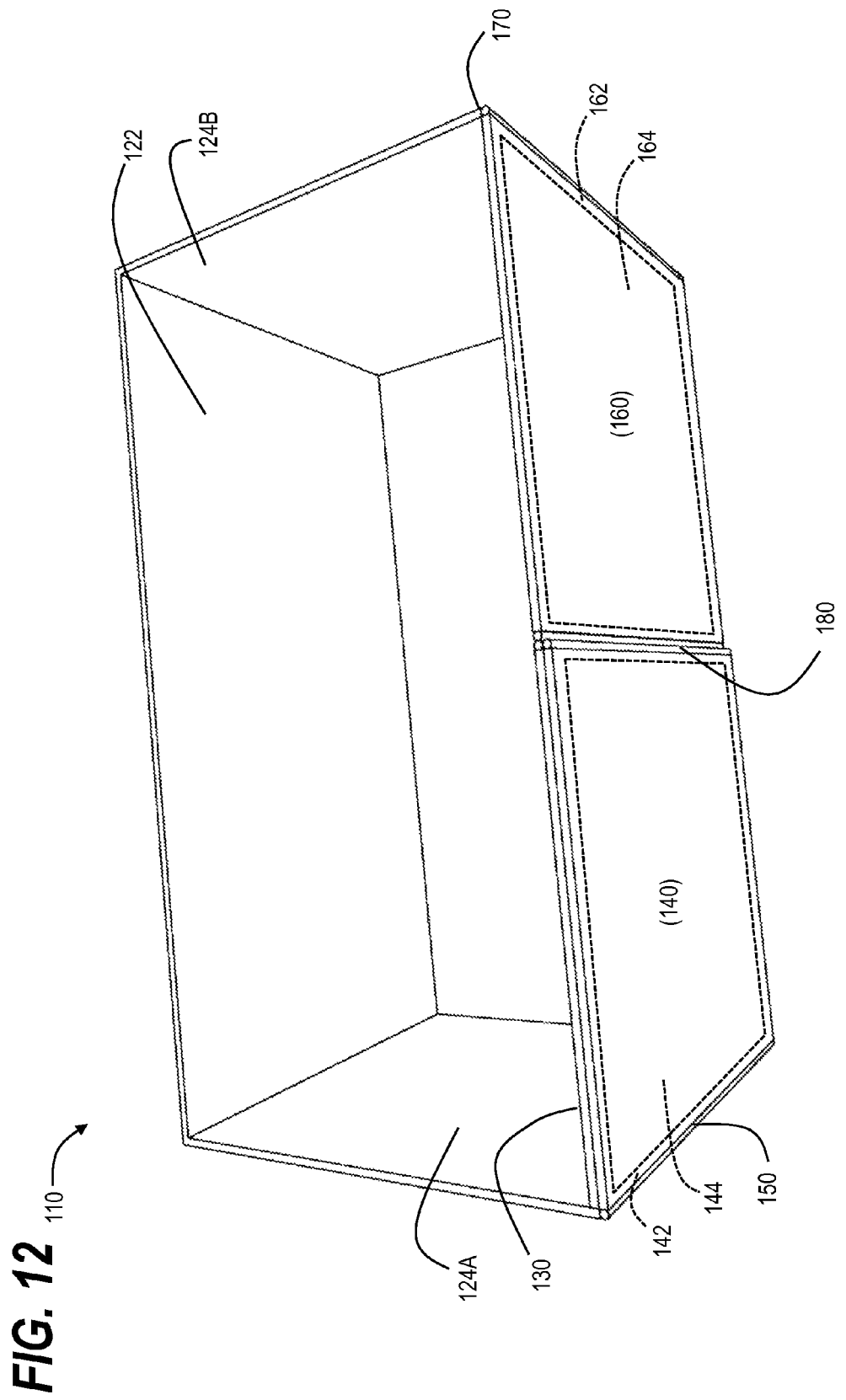
FIG. 12 illustrates the second configuration of a convertible door system of FIG. 9 where the moveable adjoining wall is affixed to the first door assembly about a common hinge assembly.

FIG. 12 illustrates the second configuration of a convertible door system of FIG. 9 where the moveable dividing wall 130 is affixed to the first door assembly 140 about the first hinge assembly 150 immediately before opening the first door assembly 140 and second door assembly 160 from the outward section of the door accessible compartment 128.

Figure 13:
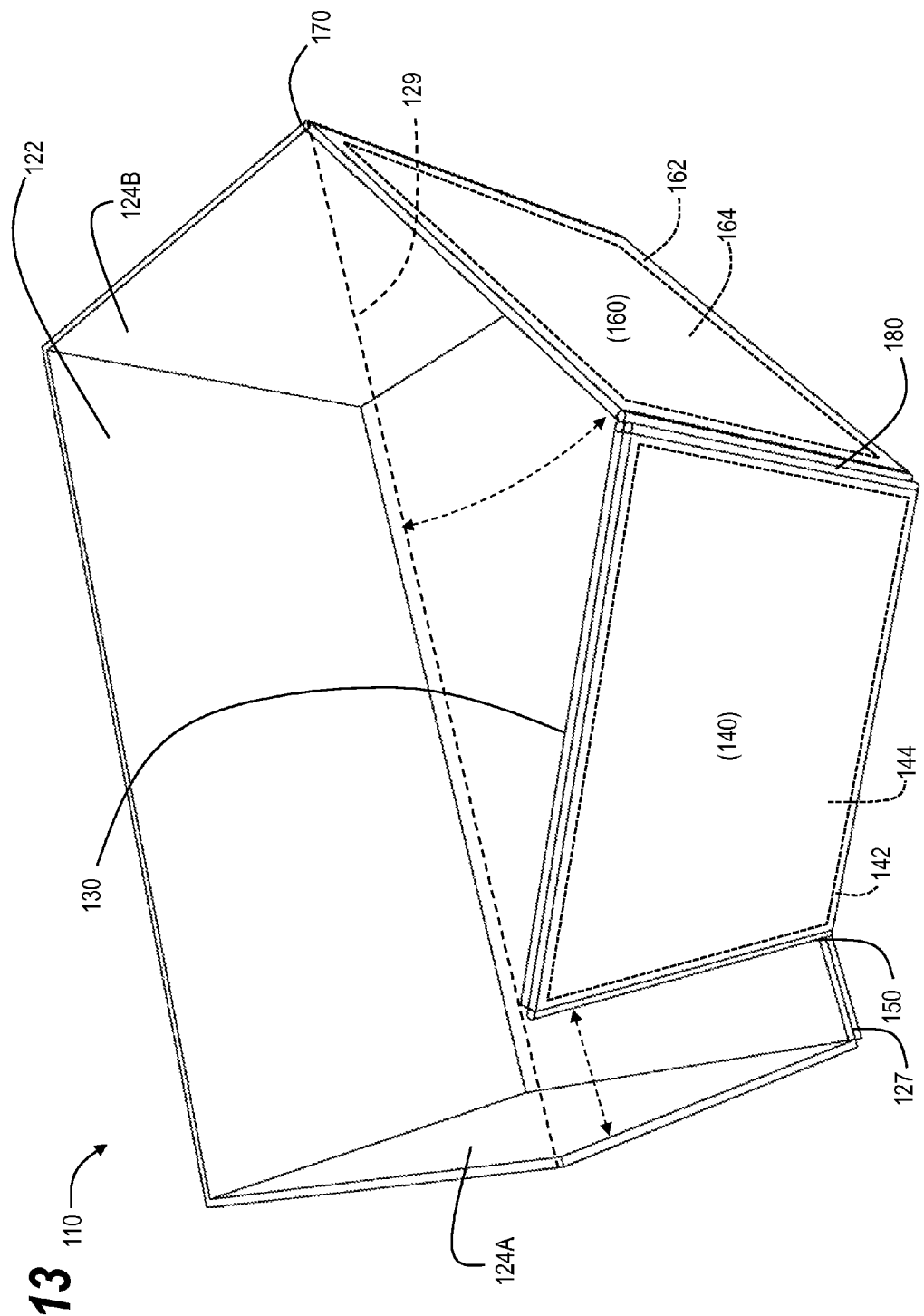
FIG. 13 illustrates the second configuration of a convertible door system of FIG. 9 where the moveable adjoining wall is affixed to the first door assembly and the first and second door assemblies begin to move outwardly at a commonly attached hinge assembly while an opposite end of the first door assembly slides along a track in a direction toward a fixed hinge assembly of the second door assembly.

FIG. 13 illustrates the second configuration of a convertible door system of FIG. 9 where the moveable dividing wall 130 is affixed to the first door assembly 140, and the first door assembly 140 and the second door assembly 160 begin to move outwardly at the commonly attached third hinge assembly 180 while an opposite end of the first door assembly 140 slides along a track 127 in either the upper compartment support structure 129 or the lower member of the door accessible compartment 120, and slides in a direction toward the second hinge assembly 170 of the second door assembly 160.

Figure 14:
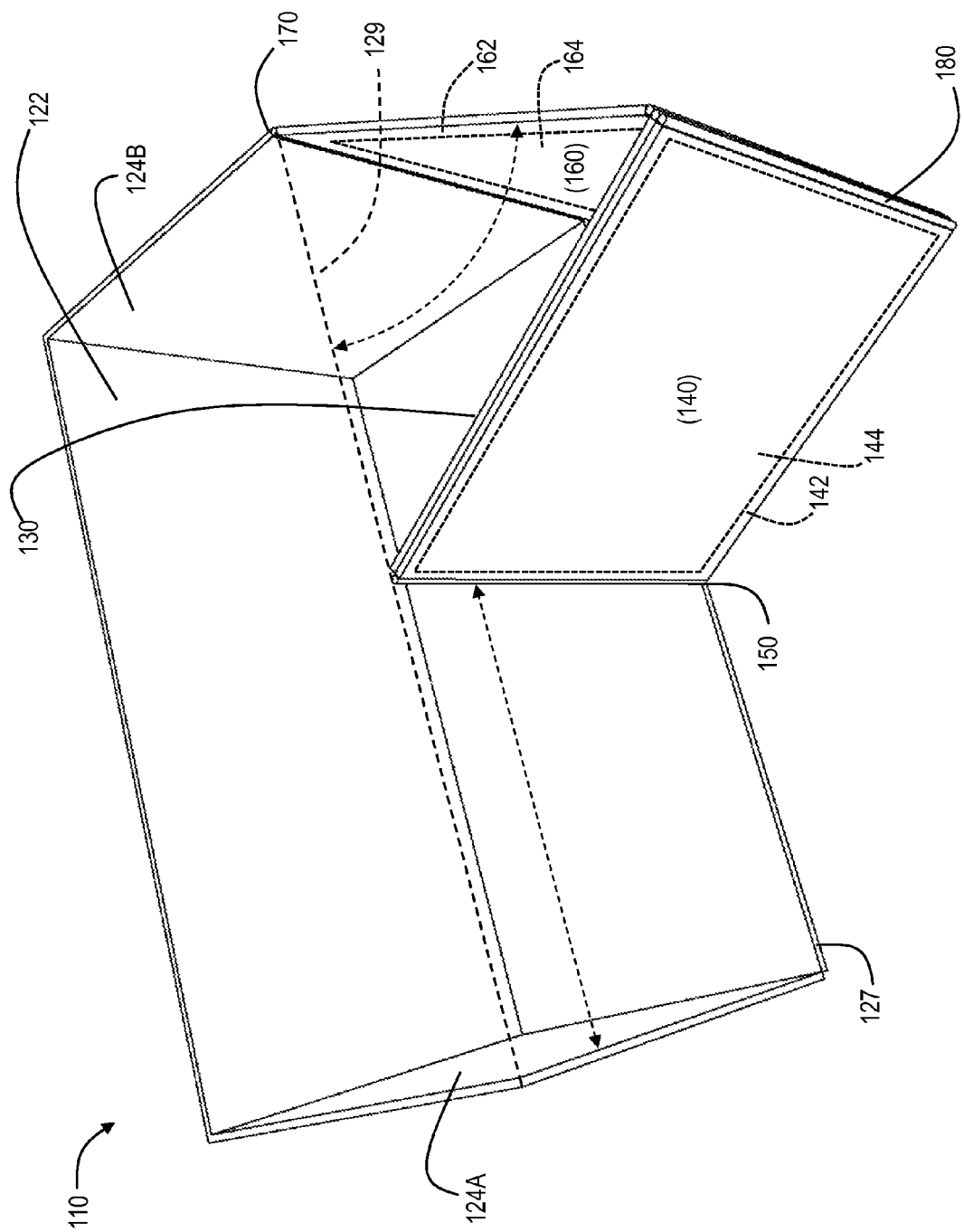
FIG. 14 illustrates the second configuration of a convertible door system of FIG. 9 where the moveable adjoining wall, the first and second door assemblies continue to open in the manner illustrated in FIG. 13.

FIG. 14 illustrates the second configuration of a convertible door system of FIG. 9 where the moveable dividing wall 130, the first door assembly 140 and the second door assembly 160 continue to open in the manner illustrated in FIG. 13 providing a larger area to the outward section of the door accessible compartment 128.

Figure 15:
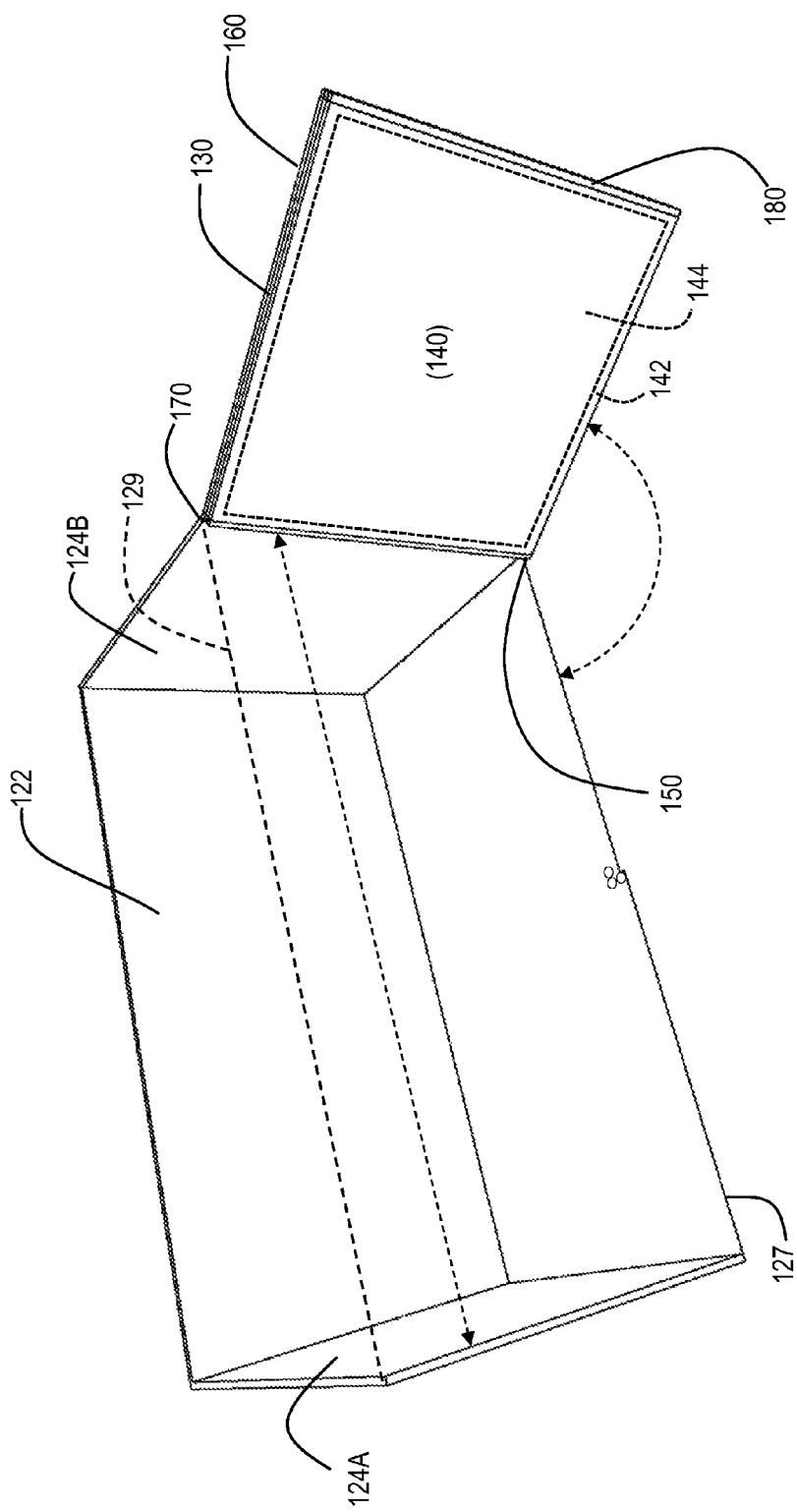
FIG. 15 illustrates the second configuration of a convertible door system of FIG. 9 where the moveable adjoining wall, the first and second door assemblies are in a fully open position.

FIG. 15 illustrates the second configuration of a convertible door system of FIG. 9 where the moveable dividing wall 130, the first door assembly 140 and the second door assembly 160 are in a fully open position. At this position, the first door assembly 140, the releaseably attached moveable dividing wall 130 and the second door assembly 160 substantially rotate about the second hinge assembly 170 of the second door assembly 160 to allow the largest access area to the outward section of the door accessible compartment 128.

In summary, the first door assembly 140 being rotationally and translationally connected to the first hinge assembly 150, where the moveable dividing wall 130 being rotationally connected to the first door assembly 140 via the third hinge assembly 180, and where the second door assembly 160 being rotationally connected to the second hinge assembly 170 and the third hinge assembly 180. The moveable dividing wall 130 being rotated about the third hinge assembly 180 adapted to be releaseably joined to an interior side of the first door assembly 140.

The first door assembly 140, with the releaseably joined moveable dividing wall 130, being configured to rotate, about the first hinge assembly 150, outwardly away from the outward section of the door accessible compartment 128, and translate, in a direction defined as a line between the first hinge assembly 150 and the second hinge assembly 170, and where the second door assembly 160 being configured to rotate about the second hinge assembly 170, outwardly from the outward section of the door accessible compartment 128.

The first door assembly 140, with the releaseably joined moveable dividing wall 130, and the second door assembly 160, each being configured to rotate, substantially about the second hinge assembly 170, outwardly away from the outward section of the door accessible compartment 128.

The first door assembly 140, with the releaseably joined moveable dividing wall 130, being configured to rotate, about the first hinge assembly 150, inwardly towards the outward section of the door accessible compartment 128, and translate, in a direction defined as a line between the first hinge assembly 150 and the second hinge assembly 170, and where the second door assembly 160 being configured to rotate about the second hinge assembly 170, inwardly toward the outward section of the door accessible compartment 128. The first door assembly 140, with the releaseably joined moveable dividing wall 130, and the second door assembly 160 being secured to the outward section of the door accessible compartment 128.

Figure 16:
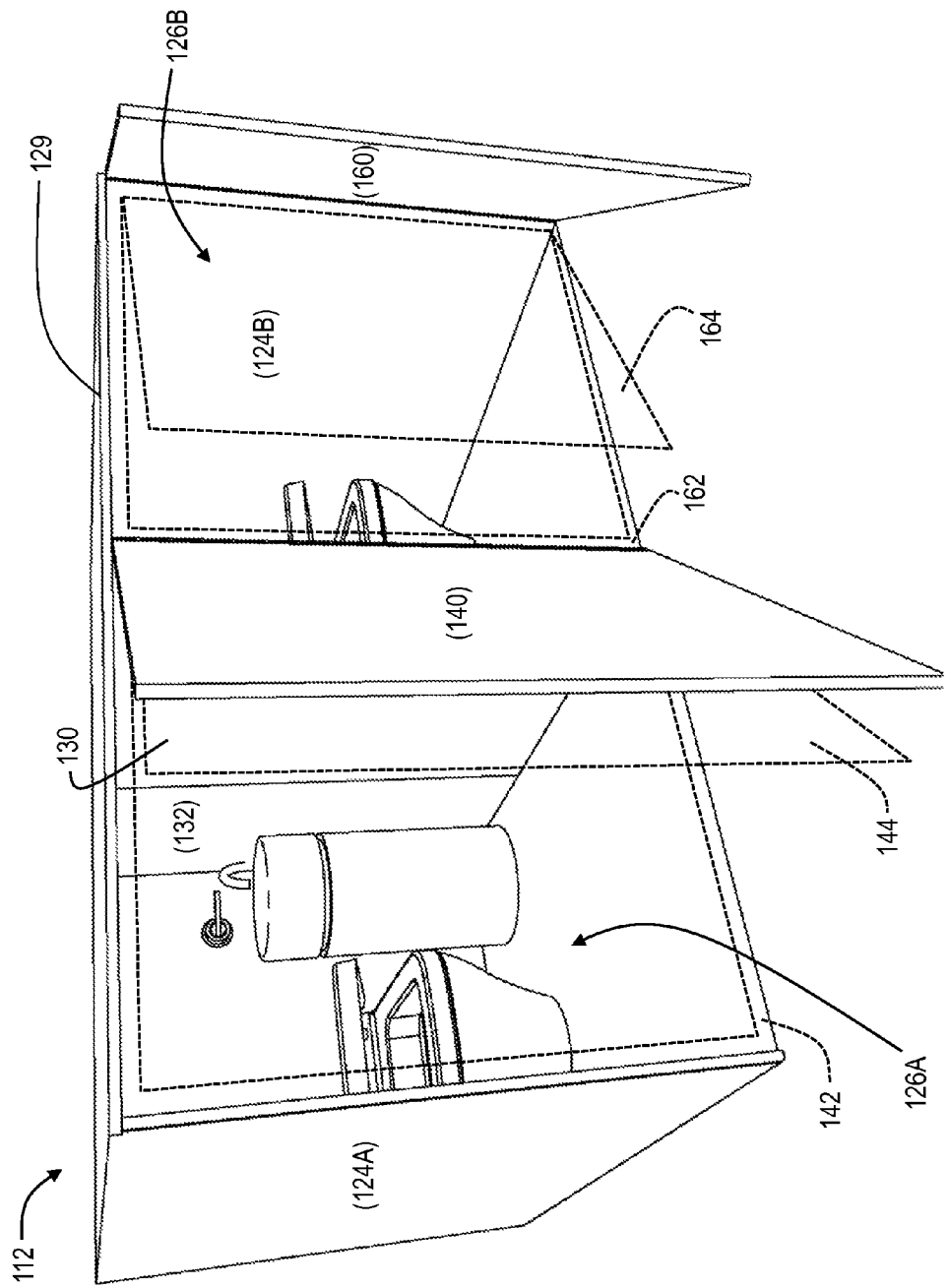
FIG. 16 illustrates a representative configuration of a compartment containing two lavatories.

FIG. 16 illustrates a representative lavatory convertible door system 112 configuration of the door accessible compartment 120 of FIGS. 9-15 containing two lavatories during a non-handicap door opening configuration where the first door assembly 140 and the second door assembly 160 open to a first sub-compartment 126A and second sub-compartment 126B, respectively.

Figure 17:
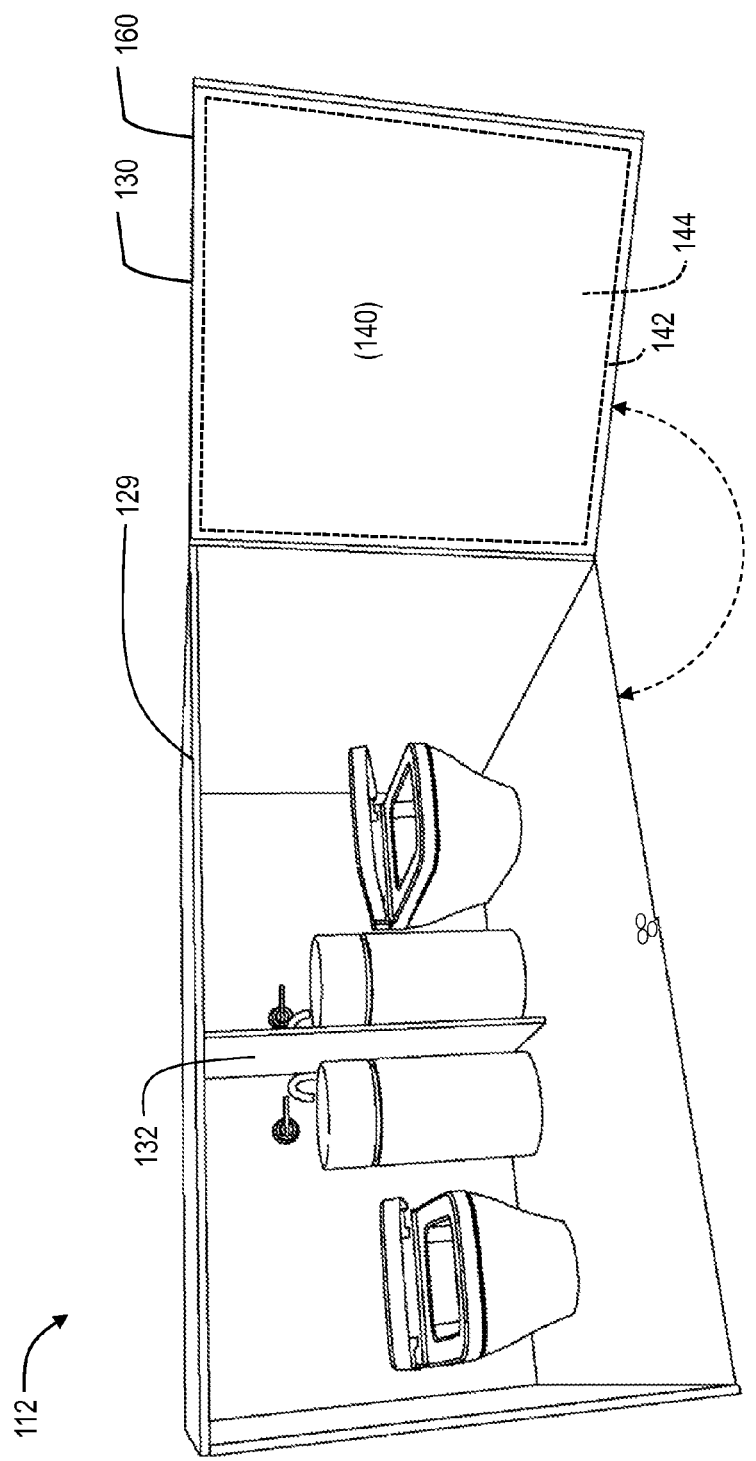
FIG. 17 illustrates the second configuration of a convertible door system of FIG. 9 on the representative configuration as illustrated in FIG. 16 where the moveable adjoining wall, the first and second door assemblies are in a fully open position.

FIG. 17 illustrates the representative lavatory convertible door system 112 configuration of door accessible compartment 120 of FIGS. 9-16 containing two lavatories during a handicap accessible door opening configuration where the first door assembly 140, the moveable dividing wall 130 and the second door assembly 160 open away from the outward section of the door accessible compartment 128 similarly shown in FIG. 15. The main distinction between FIGS. 16-17 and FIGS. 9-15 is that a fixed dividing wall 132 may add to a lateral distance of the moveable dividing wall 130 into the door accessible compartment 120 to allow more area in the door accessible compartment 120 in a direction away from the outward section of the door accessible compartment 128.

Figure 18:
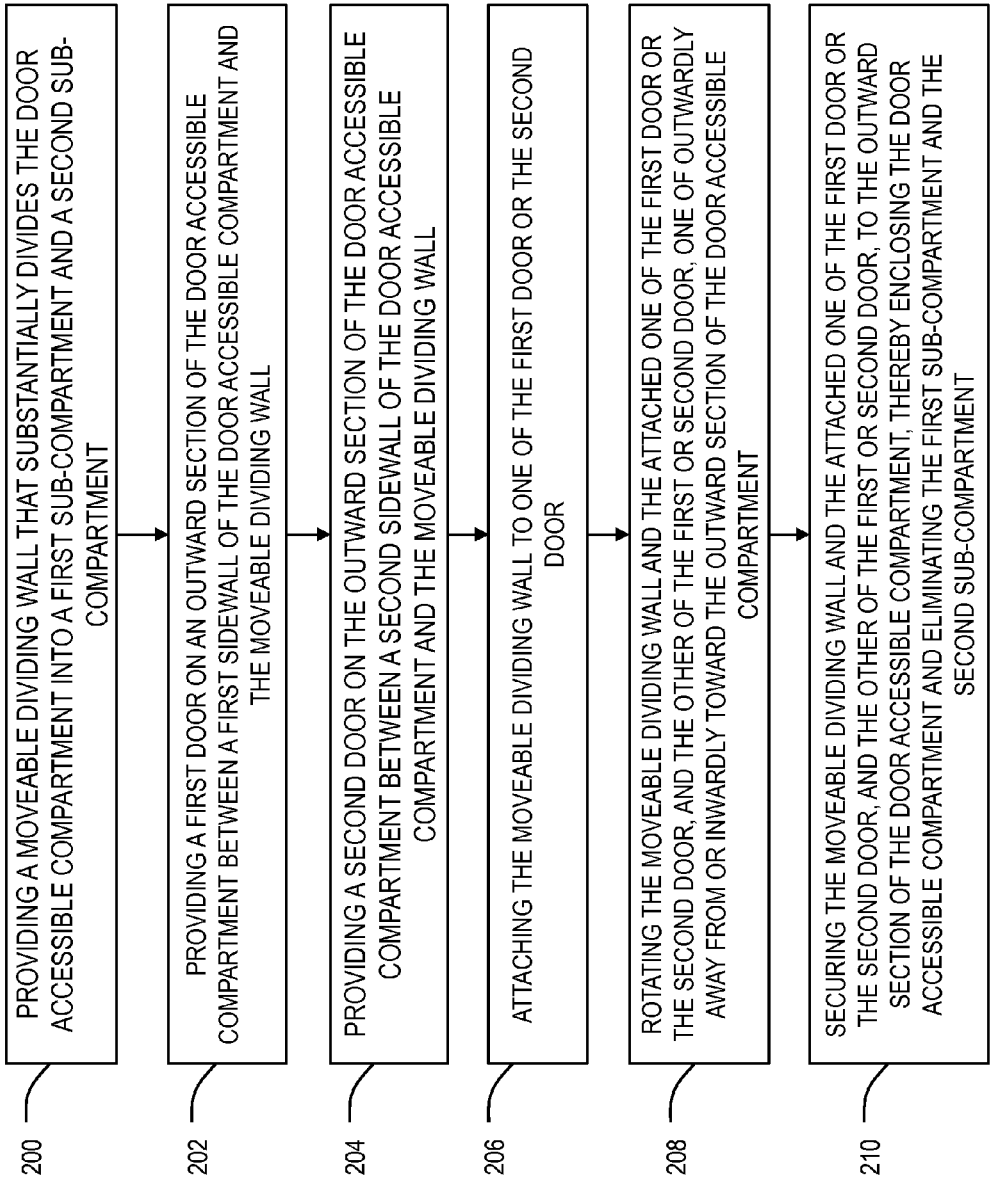
FIG. 18 illustrates a logic flow diagram for a method of operating the convertible door system for a door accessible compartment as illustrated in FIGS. 1-8.

FIG. 18 illustrates a logic flow diagram for a method of operating the convertible door system for a door accessible compartment as illustrated in FIGS. 1-8, where a method of operating a convertible door system for a door accessible compartment 20 includes providing 200 a moveable dividing wall 30 that substantially divides the door accessible compartment 20 into a first sub-compartment 26A and a second sub-compartment 26B, and providing 202 a first door assembly 40 on an outward section of the door accessible compartment between a first of two opposing sidewalls 24A of the door accessible compartment 20 and the moveable dividing wall 30. A second door assembly 60 on the outward section of the door accessible compartment 28 is provided 204 between a second of two opposing sidewalls 24B of the door accessible compartment 20 and the moveable dividing wall 30. The moveable dividing wall 30 is attached 206 to one of the first door assembly 40 or the second door assembly 60, and the moveable dividing wall 30 and the attached one of the first door assembly 40 or the second door assembly 60, and the other of the first or second door assembly, are rotated 208 one of outwardly away from or inwardly toward the outward section of the door accessible compartment 28. The moveable dividing wall 30 and the attached one of the first door assembly 40 or the second door assembly 60, and the other of the first or second door assembly, are secured 210 to the outward section of the door accessible compartment 28, thereby enclosing the door accessible compartment 20 and eliminating the first sub-compartment 26A and the second sub-compartment 26B.

The method further includes releaseably joining the moveable dividing wall 30 to an interior side of one of the first door assembly 40 or the second door assembly 60, and releasing the moveable dividing wall 30 from the interior side of one of the first door assembly 40 or the second door assembly 60, and securing the moveable dividing wall 30 to the door accessible compartment 20 thereby dividing the door accessible compartment 20 into the first sub-compartment 26A and the second sub-compartment 26B.

Figure 19:
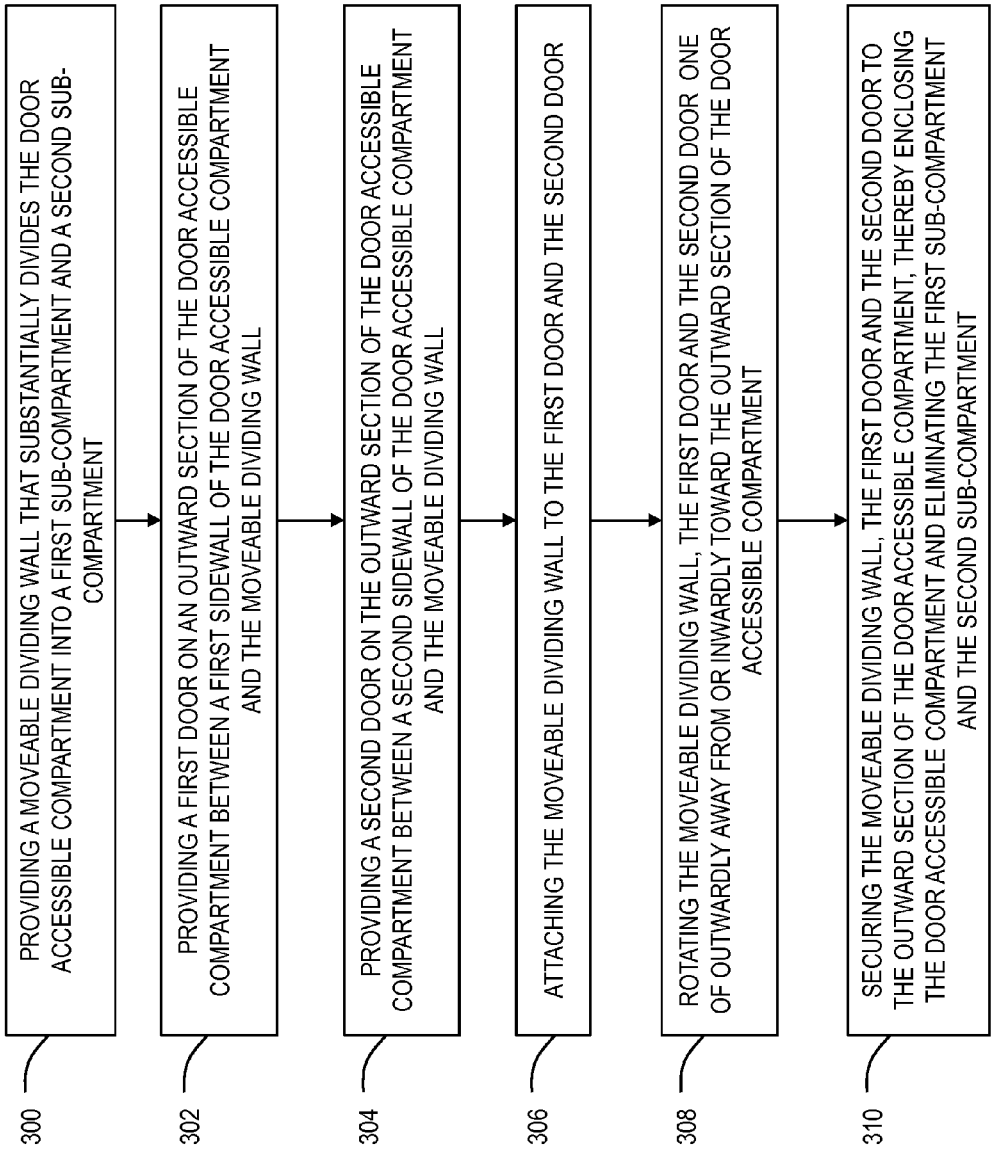
FIG. 19 illustrates a logic flow diagram for a method of operating the convertible door system for a door accessible compartment as illustrated in FIGS. 9-17.

FIG. 19 illustrates a logic flow diagram for a method of operating the convertible door system for a door accessible compartment as illustrated in FIGS. 9-17 where a method of operating an alternative convertible door system 110 for a door accessible compartment 120 that includes providing 300 a moveable dividing wall 130 that substantially divides the door accessible compartment 120 into a first sub-compartment 126A and a second sub-compartment 126B, providing 302 a first door assembly 140 on an outward section of the door accessible compartment 128 between a first of two opposing sidewalls 124A of the door accessible compartment 120 and the moveable dividing wall 130. A second door assembly 160 on the outward section of the door accessible compartment 128 is provided 304 between a second of two opposing sidewalls 124B of the door accessible compartment 120 and the moveable dividing wall 130. The moveable dividing wall 130 is attached 306 to the first door assembly 140 and the second door assembly 160.

The moveable dividing wall 130, the first door assembly 140 and the second door assembly 160 are rotated 308 one of outwardly away from or inwardly toward the outward section of the door accessible compartment 128. The moveable dividing wall 130, the first door assembly 140 and the second door assembly 160 are secured 310 to the outward section of the door accessible compartment 128, thereby enclosing the door accessible compartment 120 and eliminating the first sub-compartment 126A and the second sub-compartment 126B. The method further includes translating a portion of the first door assembly 140 within a plane defined by an opening of the outward section of the door accessible compartment 128. The method further includes releaseably joining the moveable dividing wall 130 to an interior side of one of the first door assembly 140 or the second door assembly 160. The method further includes rotating the first door assembly 140, the moveable dividing wall 130 and the second door assembly 160 about a substantially similar axis of rotation outwardly away from the outward section of the door accessible compartment 128.

The subject matter described above is provided by way of illustration only and should not be construed as limiting. Various modifications and changes may be made to the subject matter described herein without following the example configurations and applications illustrated and described, and without departing from the true spirit and scope of the present disclosure, which is set forth in the following claims.

The invention claimed is:

1. A convertible door system comprising:
   a door accessible compartment including a rear wall and two opposing sidewalls;
   a moveable dividing wall that substantially divides the door accessible compartment into a first sub-compartment and a second sub-compartment, the moveable dividing wall being releaseably joined along a first edge to the rear wall;
   a first door assembly disposed on an outward section of the door accessible compartment between a first of the two opposing sidewalls and the moveable dividing wall, the first door assembly configured to allow access to the first sub-compartment;
   a first hinge assembly adapted to rotationally join the first door assembly to the first of the two opposing sidewalls;
   a second door assembly disposed on the outward section of the door accessible compartment between a second of the two opposing sidewalls and the moveable dividing wall, the second door assembly configured to allow access to the second sub-compartment;
   a second hinge assembly adapted to rotationally join the second door assembly to the second of the two opposing sidewalls; and
   a third hinge assembly adapted to rotationally join a second edge of the moveable dividing wall to at least one of the first door assembly or the second door assembly, where the third hinge assembly being adapted to be releaseably disjoined from the door accessible compartment while still being rotationally joined to the at least one of
      the first door assembly rotationally joined by the first hinge assembly to the first of the two opposing sidewalls, or
      the second door assembly rotationally joined by the second hinge assembly to the second of the two opposing sidewalls,
   where the first door assembly and the second door assembly may each comprise one of a unitary door or a combination of an integrated door within a door frame.

2. The convertible door system according to claim 1, where the first door assembly being rotationally and releaseably connected to one of the first hinge assembly or the third hinge assembly,
   where the second door assembly being rotationally and releaseably connected to one of the second hinge assembly or the third hinge assembly,
   where the moveable dividing wall remains in a releaseably fixed position to divide the door accessible compartment into the first sub-compartment and the second sub-compartment.

3. The convertible door system according to claim 1, where the first door assembly being rotationally connected to the first hinge assembly,
   where the moveable dividing wall being rotationally connected to the first door assembly via the third hinge assembly, and
   where the second door assembly being rotationally connected to the second hinge assembly.

4. The convertible door system according to claim 3, where the moveable dividing wall being rotated about the third hinge assembly adapted to be releaseably joined to an interior side of the first door assembly.

5. The convertible door system according to claim 4, where the first door assembly, with the releaseably joined moveable dividing wall, and the second door assembly are configured to rotate outwardly away from the outward section of the door accessible compartment.

6. The convertible door system according to claim 4, where the first door assembly, with the releaseably joined moveable dividing wall, and the second door assembly being configured to rotate inwardly toward the outward section of the door accessible compartment.

7. The convertible door system according to claim 4, where the first door assembly, with the releaseably joined moveable dividing wall, and the second door assembly being secured to the outward section of the door accessible compartment.

* * * * *